(No Model.)
G. S. & W. B. MORGAN.
DRAFT WAGON.
No. 315,531. Patented Apr. 14, 1885.
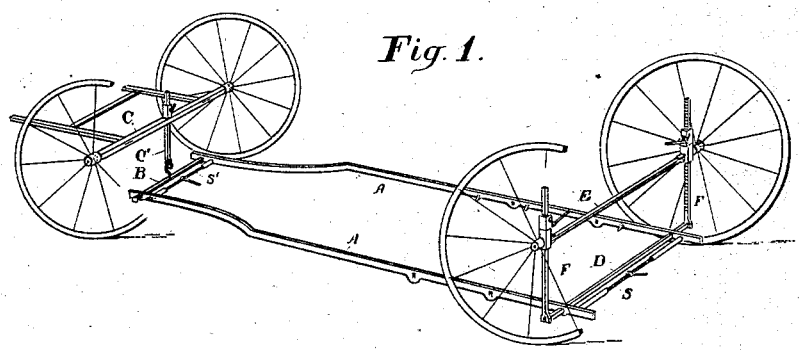
Fig. 1.
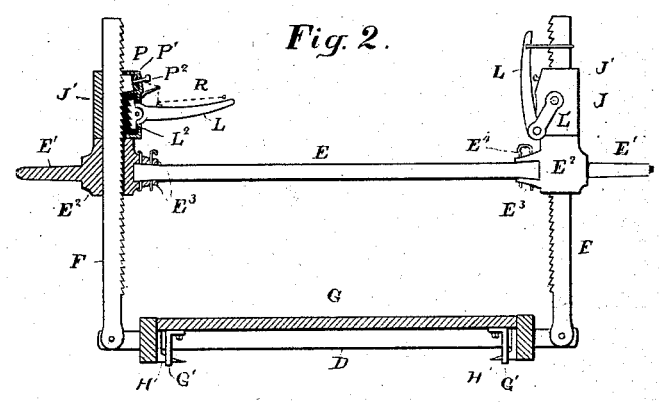
Fig. 2.
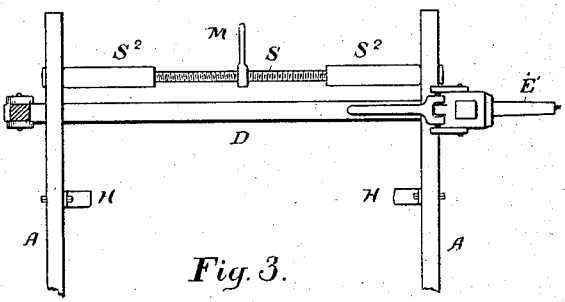
Fig. 3.
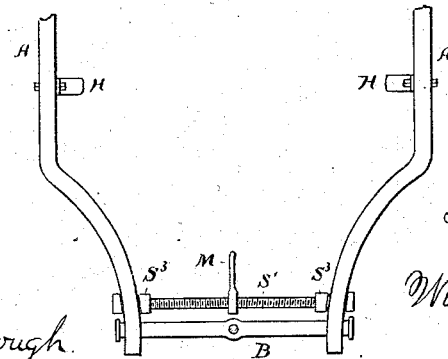
Witnesses:
H. N. Wells
Rich'd A. Goldsbrough.
Inventors,
Garrard S. Morgan,
William B. Morgan,
per A. B. Upham
Att'y.

UNITED STATES PATENT OFFICE.

GARRARD S. MORGAN AND WILLIAM B. MORGAN, OF PEORIA, ILLINOIS.

DRAFT-WAGON.

SPECIFICATION forming part of Letters Patent No. 315,531, dated April 14, 1885.

Application filed April 25, 1884. (No model.)

*To all whom it may concern:*

Be it known that we, GARRARD S. MORGAN and WILLIAM B. MORGAN, of Peoria, in the county of Peoria, in the State of Illinois, have invented an Improved Draft-Wagon; and we do hereby declare that the following is a full, clear, and exact description thereof, reference being had to the annexed drawings, making a part of this specification, in which like letters of reference refer to like parts, and in which—

Figure 1 represents a perspective view of our invention; Fig. 2, a central transverse section; Fig. 3, a plan view with parts removed.

This invention is in the line of wagons for carrying stone, safes, and other bulky bodies, and relates especially to means whereby its bed may be made laterally contractible, and also lowered and raised, to enable its load to be more easily placed thereon.

In the drawings, A A are the side bars of the wagon-bed; B, the front end bar depending by the king-bolt C' from the axle C; D, the rear cross-bar of the bed; E, the rear axle of the wagon, and P the platform of the bed.

The end bars, B and D, pass through openings in the side bars, A, and thus permit the latter to be moved toward and from each other, and the width of the wagon-bed to be accordingly changed. To move these side bars, A, and hold them when adjusted, we employ the oppositely-threaded screws S S', one behind the front end bar, B, and the other just behind the rear end bar, D. These screws enter nuts $S^2 S^3$, secured to the side bars, A. The hand-levers M, connected to the said screws S S' by a ratchet-and-pawl device, such as is ordinarily employed for the purpose, enable a continuous rotary motion to be given to said screws by an oscillatory motion of said levers. As the front ends of the side bars, A A, are bent toward each other, as shown in Fig. 3, to make room for the front wheels when turning a corner, the ends of the screw S' must pass through the side bars, A, to give the same an amount of approach equal to that given them by the screw S and its elongated nuts $S^2$.

To permit the raising and lowering of the wagon-bed, the king-bolt C', whose lower end is hooked to the eye secured to the end bar B, is notched upon one side and passes through the axle C and a jack resting thereon. This jack, consisting of a pawl and lever, hereinafter described, enables said notched king-bolt C' to be forced up through the axle C, and the forward end of the wagon-bed raised accordingly. The rear end bar, D, is pivoted at its ends to notched uprights similar to the king-bolt C'. These uprights F pass through openings in the rear axle, E. Each upright F is provided with a jack, J, resting upon the axle E, by means of which jack the rear of the wagon-bed is raised and lowered. The jacks J for the uprights F are similar to the jack provided for the king-bolt C', and are constructed as follows: A sleeve, which forms the body of the jack, has within it two notched blocks—one of which, furnished with a detracting knob, forms the pawl therefor, and the other of which, pivoted to a lever, transmits the power to the notched upright therein. The lever L is pivotally secured to the sleeve J' by means of links L', as shown in Fig. 2.

To prevent the pawl P from becoming disengaged from the notched upright F, we introduce a bent spring, P', behind the same. A small wire rope, R, passing through suitable eyes, enables the pawl P to be released from the notched upright by the same hand that is working the lever L when it is desired to lower the wagon-bed.

At the lower inside edges of the side bars, A, are several projecting feet, H, secured thereto by bolts. The object of these feet is, first, to serve as a means whereby to hold the platform G in place, as in Fig. 2, and next to hold stones by being pressed in under the edges of the same, the platform being removed. The feet H retain the platform in place by entering the eyes G', secured to the under side of said platform. The side bars, A, being separated a little, the feet H are withdrawn from the eyes G' and the platform may be removed.

To enable a safe or other object to be moved onto the platform from the rear, we have the central portion of the axle E removable. While the wagon-bed is resting upon the ground there is no pressure against the axle, and there is no objection to having a portion thereof removed, provided we return the same before attempting to jack up the wagon-bed. Our axle E therefore consists of the axial parts E', upon which the wheels revolve, of the sleeve portion $E^2$, connected rigidly thereto, and through which pass the notched uprights F, and of the removable central part, E. The removable beam E is rigidly secured to the sleeves $E^2$ $E^2$ by two bosses, $E^3$, projecting from each of them, and by means of pins $E^4$, passing through said bosses and the ends of the axle E therebetween. We usually do not remove one of these pins, that it may serve as a pivotal hinge upon which to swing the axle E around to one side.

In using this wagon to transport safes and similar objects, which would be loaded thereon from the rear, the wagon is backed up to the sidewalk or door-step and its bed lowered until it rests upon either the ground, the curb-stone, or the step. The axle E is then removed and the article loaded upon the platform of the wagon-bed. Having resecured the axle, the bed is jacked up to a height to avoid obstructions on the ground, and the wagon is driven away.

To transport large flat stones lying upon the ground, the platform G is removed and the wagon driven over the stone, the bed having previously been elevated sufficiently high to clear the same. The wagon-bed being centrally located over the stone, it is lowered until its side bars, A, rest upon the ground beside the stone. Then, by turning the screws S S', the side bars are brought together until the feet H are forced under the stone lying between, which is now held thereby while the bed is raised and wagon and load driven away. In unloading, the converse operation is gone through with.

What we claim as our invention, and for which we desire Letters Patent, is as follows:

1. In a draft-wagon, the side bars, A, having transverse openings therethrough, in combination with end bars, B D, removable in said openings, and the oppositely-threaded screws S S', connecting with said side bars, A, whereby the same may be brought nearer together or moved farther apart, substantially as set forth.

2. In a draft-wagon, a bed consisting of side bars, A, and end bars, D B, king-bolt C', secured to the end bar B, and passing through the front axle, C, and a jack for vertically adjusting said king-bolt, in combination with the uprights F, pivoted to the ends of the end bar D, openings in the rear axle, E, for receiving said uprights, and jacks J, for adjusting vertically said uprights, substantially as and for the purpose specified.

3. In a draft-wagon, the side bars, A, having transverse openings therethrough, in combination with the end bars, B D, removable in said openings, the oppositely-threaded screws S S', connecting with said side bars, and the platform G, adapted to be held in place between the said side bars, substantially as and for the purpose specified.

4. In combination with the end bars, B D, and side bars, A, removable thereon, the feet H, for the purpose set forth.

5. As a means whereby to raise and lower the notched uprights F and king-bolt C', the sleeve J', notched pawl-block P, spring P', and knob $P^2$, in combination with the notched block $L^2$, lever L, links L', and cord or wire rope R, as set forth.

6. In a draft-wagon, the side bars, A, having transverse openings therethrough, in combination with the end bars, B D, removable in said openings, the screws S S', connecting with said side bars, the platform G, and eyes G', projecting therefrom and adapted to receive the feet H of the said side bars, as set forth.

7. In a draft-wagon, a bed consisting of side bars, A, and end bars, B D, in combination with the king-bolt C', secured to the end bar B, and passing through the front axle, C, a jack for vertically moving said king-bolt, the uprights F, joined to the ends of the end bar D, openings in the rear axle, E, for receiving said uprights, jacks for raising said uprights, and means, substantially as shown, whereby the central portion of said axle E may be removed to permit passage from the rear end of the wagon-bed to the center or front thereof.

8. In a draft-wagon, the side bars, A, having transverse openings therethrough, in combination with the end bars, B D, removable in said openings, the elongated nuts $S^2$ $S^3$, secured to said side bars, the oppositely-threaded screws S S', turning in said nuts, and means for revolving said screws, substantially as and for the purpose specified.

9. The wheel-bearings E', sleeve portions $E^2$, bosses $E^3$, projecting therefrom, and pins $E^4$, in combination with the axle E, as described.

In testimony that we claim the foregoing invention we have hereunto set our hands and seals this 22d day of April, 1884.

GARRARD S. MORGAN. [L. S.]
WILLIAM B. MORGAN. [L. S.]

Witnesses:
EDMUND W. QUINCY,
JUDSON STARR.